Nov. 3, 1959          C. B. WALTON          2,910,773

OPERATIVE AND PROSTHETIC PARALLELING INSTRUMENT

Filed Dec. 30, 1957

INVENTOR:
CHARLES B. WALTON
BY:
Beau, Brooks, Buckley & Beau,
ATTORNEYS.

2,910,773
OPERATIVE AND PROSTHETIC PARALLELING INSTRUMENT

Charles B. Walton, Pittsburgh, Pa.

Application December 30, 1957, Serial No. 705,984

4 Claims. (Cl. 32—67)

This invention relates to improvements in operative and prosthetic instruments, and more particularly to an improved gauge for guiding the dentist in preparation of precisely parallel abutments when cutting teeth for fixed and precision bridgework, partial dentures, splints or the like, and when otherwise modifying teeth and preparing bridgework, partial dentures, splints, etc., to be placed thereon.

So-called "paralleling" instruments which have previously been devised have not been fully successful in meeting the various requirements thereof, because of their lack of flexibility of adjustment to permit them to reach areas of the teeth that are not on the same occlusal plane, and which are tilted in their axial relations. The bar and tube type parallelmeter is awkward to use and lacks flexibility of adjustment to varying distances between teeth and to the gingival margins of the individual tooth surfaces.

One of the objects of the present invention is to provide an instrument as aforesaid which is simple to use and small in bulk, and which is easily adaptable to various tooth inclinations and to different levels of occlusal surfaces on the abutment teeth, and which facilitates precise paralleling of the preparations.

Another object is to provide an instrument as aforesaid which is usable, both as a paralleling guide during preparation of the teeth, and for verification of the alignment of the completed preparations. Other objects of the invention will appear from the specification hereinafter.

In the accompanying drawing one example of an instrument embodying features of the invention is illustrated; and as shown herewith:

Figure 1:
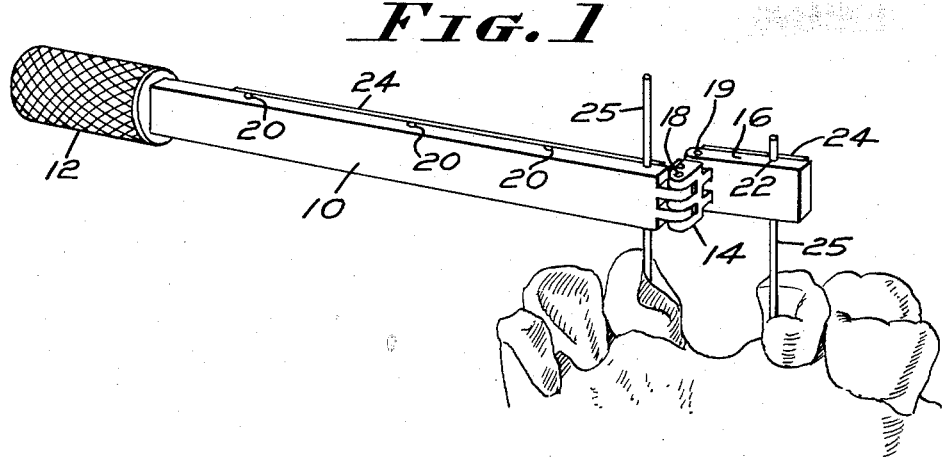
Fig. 1 is a perspective view illustrating an instrument of the invention disposed in abutment measuring position.
Figure 2:
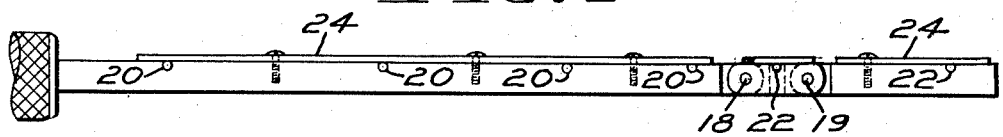
Fig. 2 is a top plan view of the tool of Fig. 1.

The invention contemplates an instrument which overcomes the above recited objections. It provides a device whereby with maximum convenience and precision opposing surfaces of the cavity walls of one abutment may be checked for parallelism. Also, mandrels for precision attachment boxes may be placed in the instrument so that space for these receptacles may be accurately cut into the abutment teeth. This minimizes the required cutting away of tooth substance and complications when later placing the female parts of the attachments in the abutment castings.

As shown in the drawing, the instrument may comprise a thin rectangular sectioned stainless steel bar 10 having a knurled finger grip portion 12. A pair of hinged sections 14, 16 extend from the working end of the bar 10; being articulated to the bar 10 as by means of hinges as indicated at 18, 19. The bar portion 10 is provided with a plurality of vertical partial bores or recesses 20 disposed at various distances from each other along the length of the bar; and the end sections are similarly bored as indicated at 22. The recesses 20, 22 accommodate in slip-fitting relation stiff stainless steel pins 25 which are held against accidental slippage in the holes by spring pressure provided as by means of spring plates 24 bolted or welded or otherwise suitably fixed to the bar portions.

When using the instrument, the pins are placed in the recesses that seem best suited to match the approximate distance between bridge abutments to be gauged; one of the pins being placed in a recess in either one of the end hinged sections. The distance between the pins should be slightly greater than the span between the teeth to be gauged when the instrument is fully extended. This allows the hinges to be flexed so the mounted pins may be adjusted easily and accurately to the abutment surfaces. Each pin may then be pushed up or down so that it will extend to the gingival margin of the tooth surface that is being cut. When cutting pinholes in teeth at various levels, for example, the pins of the instrument may in this manner be easily shortened or lengthened to contact the involved cavity preparations. The instrument allows the pins to be quickly adjusted to the distance between the abutment teeth; and the pins are easily shortened or lengthened to extend to the gingival margins or incisal pinholes of each tooth surface that is being cut.

Figure 3:
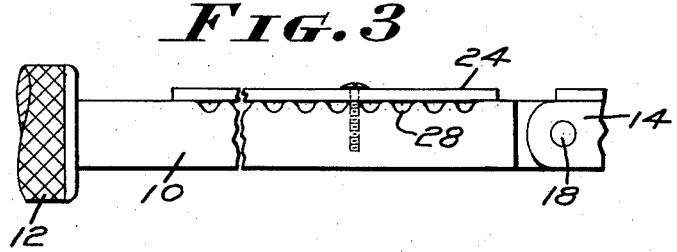
Fig. 3 is a fragmentary top plan of a somewhat modified form of the tool.

Fig. 3 shows a somewhat modified form of the gauge wherein the recesses 28 in the bar to accommodate the pins 25 are relatively close together to provide maximum flexibility in adjusting the pin positions.

Figure 4:
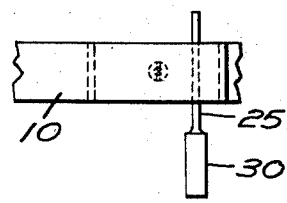
Fig. 4 is a fragmentary front elevation of the tool illustrating the mounting therein of a precision mandrel.

The instrument is also adaptable for aligning the box forms in teeth that are to carry precision attachments. For this purpose mandrels are attached to the pins. The mandrels being slightly wider than the female attachments to be placed in the teeth. For example, if a molar and a cuspid are to comprise the abutments, mandrels as indicated at 30 (Fig. 4) are mounted on the pins. As the box forms are cut, they are aligned and sized to accommodate the mandrels. In this way the box forms are parallel, and at the same time are cut to the precise width and depth to accommodate the attachment. Later, the female attachment may be accurately positioned within the tooth contour to take advantage of the full length of the attachment, and to avoid a protruded gingival margin on the abutment casting. The position of the attachment on a cuspid or bicuspid abutment can be gauged with the mandrel so that the box form will not be too close to the labial or buccal surface of the tooth. This can be important to prevent mechanical difficulty in placing the adjoining pontic.

Such attachments can be used when the abutment teeth are short and require a lingual clasp arm for retention of a removable prosthesis.

The instrument may also be used against the contours of proximal surfaces of abutment teeth to guide the reduction of excessive proximal contours and to prevent large spaces from occurring between the bridge strut and the abutment tooth below the height of proximal contour. Occasionally, a malaligned tooth, usually a molar or a bicuspid, may need to have a buccal or lingual bulge of contour removed for more satisfactory clasping. The instrument of the invention will in such case serve as a guide for the modification of these teeth. In simple, unilateral, clasp-type removable dentures, the instrument may be used on the cast for the initial or tentative surveying, to determine the path of insertion of the restoration.

Sometimes it is desirable to use a deep precision rest in one fixed-bridge abutment casting. This rest must then be parallel to the line of insertion of the other abutment casting. It is reasonably simple to insure this by waxing the rest mandrel to one pin of my instrument (when waxing the abutment patterns in the laboratory); and with the regular pin of the instrument resting against the wall of the other abutment preparation, the rest may be aligned to this cavity wall to assure parallelism.

The double flexibility of the hinges 18, 19 make it easy to place the pins where they are needed; and the instrument may be turned upside down when used because it does not have a "right" side as have other paralleling meters.

The small size and simplicity of construction, and flexibility characteristics of the instrument of the invention render it extremely versatile for use in construction of fixed and removable bridgework. It insures that the preparations are well made and are parallel before the impressions, casts, and castings are completed. The laboratory details may then be proceeded with; the technician being confident that the bridge or fixed splint will fit the teeth without difficulty.

Although only a few forms of the gauge of the invention have been shown and described in detail, it will be apparent to those skilled in the art that the invention is not so limited but that various changes may be made therein without departing from the spirit of the invention or the scope of the appended claims.

I claim:

1. An operative and prosthetic instrument usable as a paralleling gauge in preparation of abutment teeth and on casts or models of the mouth in preparation of bridgework, comprising a bar member having an manual grip handle at one end, a pair of bar extension sections hingedly mounted in successively articulated relation at the other end of said bar member, said bar member and extension sections being formed with recesses running parallel and vertically along side walls thereof, spring leaf means carried by said bar member and sections to overlie the recesses thereof, and a plurality of gauge pins disposed within selected of said recesses and frictionally retained therein by said spring leaf means in longitudinally slidable adjusted positions.

2. An operative and prosthetic instrument usable as a paralleling gauge in preparation of abutment teeth and on casts or models of the mouth in preparation of bridgework, comprising a bar member and a pair of bar extension sections hingedly mounted in successively articulated relation at one end of said bar member, said bar member and extension sections being formed with recesses running parallel and vertically along side walls thereof, spring means carried by said bar member and sections to overlie the recesses thereof, and a plurality of gauge pins disposed within selected of said recesses and frictionally retained therein by said spring means in longitudinally slidable adjusted positions.

3. An operative and prosthetic instrument usable as a paralleling gauge in preparation of abutment teeth and on cast or models of the mouth in preparation of bridgework, comprising a bar member having a manual grip handle at one end, a pair of bar extension sections hingedly mounted in successively articulated relation at the other end of said bar member, said bar member and extension sections being formed with openings running parallel and vertically thereof, and a plurality of gauge pins disposed within selected of said openings and frictionally retained therein in longitudinally slidable adjusted positions.

4. An operative and prosthetic instrument usable as a paralleling gauge in preparation of abutment teeth and on casts or models of the mouth in preparation of bridgework, comprising a bar member having a manual grip handle at one end, a pair of bar extension sections mounted in successively articulated relation at the other end of said bar member, said bar member and extension sections being formed with guide means directed vertically thereof, and a plurality of gauge pins disposed within selected of said guide means and frictionally retained therein in vertically slidable adjusted positions.

References Cited in the file of this patent

UNITED STATES PATENTS

| | | |
|---|---|---|
| 1,387,329 | Stark | Aug. 9, 1921 |
| 1,447,774 | Fortunati | Mar. 6, 1923 |